(12) United States Patent
Lim

(10) Patent No.: US 10,784,476 B2
(45) Date of Patent: Sep. 22, 2020

(54) SEALING APPARATUS FOR BATTERY CASE WITH INCREASED APPLICATION AREA OF PRESSURE AND HEAT

(71) Applicant: LG CHEM, LTD., Seoul (KR)

(72) Inventor: Seong Yoon Lim, Daejeon (KR)

(73) Assignee: LG Chem, Ltd. (KR)

(*) Notice: Subject to any disclaimer, the term of this patent is extended or adjusted under 35 U.S.C. 154(b) by 265 days.

(21) Appl. No.: 15/760,817

(22) PCT Filed: Dec. 15, 2016

(86) PCT No.: PCT/KR2016/014699
§ 371 (c)(1),
(2) Date: Mar. 16, 2018

(87) PCT Pub. No.: WO2017/105098
PCT Pub. Date: Jun. 22, 2017

(65) Prior Publication Data
US 2018/0261807 A1 Sep. 13, 2018

(30) Foreign Application Priority Data
Dec. 16, 2015 (KR) .................. 10-2015-0179813

(51) Int. Cl.
*H01M 2/06* (2006.01)
*H01M 10/04* (2006.01)
(Continued)

(52) U.S. Cl.
CPC ........... *H01M 2/06* (2013.01); *H01M 2/0212* (2013.01); *H01M 2/0275* (2013.01); *H01M 2/08* (2013.01);
(Continued)

(58) Field of Classification Search
CPC .... H01M 2/06; H01M 2/0212; H01M 2/0275; H01M 2/08; H01M 10/0404; H01M 10/0525
See application file for complete search history.

(56) References Cited

U.S. PATENT DOCUMENTS 7,749,648 B2 7/2010 Kim
9,755,195 B2 9/2017 Cho et al.
(Continued)

FOREIGN PATENT DOCUMENTS

JP H06163014 A 6/1994
JP 2005-353503 A 12/2005
(Continued)

OTHER PUBLICATIONS

International Search Report for PCT/KR2016/014699 (PCT/ISA/210) dated Mar. 16, 2017.

*Primary Examiner* — Jimmy Vo
(74) *Attorney, Agent, or Firm* — Lerner, David, Littenberg, Krumholz & Mentlik, LLP

(57) ABSTRACT

The present invention provides a sealing apparatus having a structure in which an application area of pressure and heat is increased by a pair of sealing blocks and a pressurization part extending from the sealing block. In the sealing apparatus according to the present invention based on the structure, when the sealing-planned part is pressurized, heat and pressure may be applied to the sealing-planned part or an insulating film to be extended, and thus an electrode lead and the sealing-planned part adjacent thereto may be firmly bonded.

17 Claims, 10 Drawing Sheets

(51) Int. Cl.
*H01M 2/02* (2006.01)
*H01M 2/08* (2006.01)
*H01M 10/0525* (2010.01)

(52) U.S. Cl.
CPC ... *H01M 10/0404* (2013.01); *H01M 10/0525* (2013.01)

(56) References Cited

U.S. PATENT DOCUMENTS

| | | |
|---|---|---|
| 2002/0012834 A1 | 1/2002 | Sugiyama et al. |
| 2004/0081887 A1 | 4/2004 | Sugiyama et al. |
| 2013/0029214 A1 | 1/2013 | Tamura |
| 2015/0000117 A1* | 1/2015 | Cho .................. H01M 10/0404 29/623.2 |

FOREIGN PATENT DOCUMENTS

| | | |
|---|---|---|
| JP | 2006-093120 A | 4/2006 |
| JP | 2006-147230 A | 6/2006 |
| JP | 2007-242548 A | 9/2007 |
| JP | 2012-199248 A | 10/2012 |
| JP | 2013-026173 A | 2/2013 |
| KR | 10-2012-0038695 A | 4/2012 |
| KR | 10-2012-0126932 A | 11/2012 |
| KR | 10-2014-0086907 A | 7/2014 |
| KR | 10-2015-0071918 A | 6/2015 |

* cited by examiner (a)

(b)

(c)

SEALING APPARATUS FOR BATTERY CASE WITH INCREASED APPLICATION AREA OF PRESSURE AND HEAT

TECHNICAL FIELD

This application claims priority to and the benefit of Korean Patent Application No. 10-2015-0179813 filed in the Korean Intellectual Property Office on Dec. 16, 2015, the entire contents of which are incorporated herein by reference. The present invention relates to a sealing apparatus for a battery case with increased application area of pressure and heat.

BACKGROUND

Recently, as technology development and demand for mobile devices have increased, there has been a rapid increase in demand for secondary batteries capable of charging and discharging as energy sources, and thus a lot of research has been conducted on secondary batteries capable of satisfying various demands.

In addition, the secondary battery has received attention as a power source of an electric vehicle (EV), a hybrid electric vehicle (HEV), a plug-in hybrid electric vehicle (PLUG-IN HEV), etc., that are suggested as a solution to solve the air pollution of existing gasoline vehicles and diesel vehicles using fossil fuels.

Among these secondary batteries, a lithium secondary battery having high energy density and discharge voltage has been studied extensively, commercialized and widely used. As a representative one, there is a high demand for a pouch type lithium secondary battery cell in which a thickness is thin in view of a shape of a battery, lamination arrangement is easy, and the shape is capable of being partially modified.

The pouch type battery cell has a structure in which an electrode assembly and an electrolyte solution are embedded in a pouch type laminate sheet capable of accommodating the electrode assembly. The laminate sheet may also be referred to as a 'pouch type battery case' in a narrow sense, and a resin layer of the laminate sheet may be fused by heat.

In particular, the pouch type battery cell has a structure in which the laminate sheet surrounds the electrode assembly so that the electrode assembly is not exposed to the outside. Here, the sheet is sealed by applying heat and pressure to a sealing-planned part of the laminate sheet overlapping each other at an external circumference portion of the battery case. An exemplary structure of the pouch type battery cell is shown in FIG. 1.

Referring to FIG. 1, a battery cell 10 has a structure in which sealing-planned parts 14a, 14b, and 14c which are external circumference ends of the battery case 14 are sealed in a state in which electrode leads 11, 12 protrude to an outer side of the battery case 14. Here, the electrode lead 12 may have a concept including a bar-shaped lead member formed of a conductive material and an insulating film 16 attached to both surfaces of the lead member in a broad sense.

More accurately, the sealing-planned part means a portion extending from one side end portion of a seat body in the seat body of the battery case having an electrode assembly accommodating part formed thereon or an external circumferential portion of the battery case overlapping each other in a state in which a seat cover formed as an independent member with respect to the case body is in close contact with the body. These sealing-planned parts are bonded by heat and pressure to form a sealing part of the battery cell.

Meanwhile, since the sealing-planned parts 14a and 14c of the battery case corresponding to protruding portions of the electrode leads 11 and 12 are spaced apart from each other by a thickness of the electrode leads 11 and 12, it is general to apply a strong pressure so as to correspond to an outer shape of the electrode leads 11 and 12 to thereby form a state in which the sealing-planned parts 14a and 14c are in close contact with the electrode leads 11 and 12, and to apply heat in the above-described state to thereby bond the sealing-planned parts. Further, the sealing-planned parts 14a and 14c and the lead film 16 are bonded together and are integrated with each other by heat, and thus the sealing-planned portions 14a and 14c may correspond to the outer shape of the electrode leads 11 and 12 to be bonded thereto.

Nevertheless, since an area where heat is able to be applied in boundary surfaces between the electrode leads 11 and 12 and the sealing-planned parts 14a and 14c is considerably narrowed, the sealing-planned parts 14a and 14c may be difficult to be completely bonded to the electrode leads 11 and 12 in a state in which they are in close contact with each other.

Further, the sealing-planned parts 14a and 14c are bonded to the lead member indirectly while being bonded to the insulating film 16 interposed therebetween. However, in an actual process, the insulating film 16 is pushed in a protruding direction of the lead member by the pressure and is deviated to an outer side of the sealing-planned portions 14a and 14c. Eventually, a process problem that the insulating film 16 and the sealing-planned parts 14a and 14c are not bonded to each other, and thus the sealing-planned parts 14a and 14c adjacent to the electrode leads 11 and 12 are not tightly sealed frequently occurs.

The process problem that the sealing-planned part is not tightly sealed as described above causes serious problems that the electrolyte solution leaks, or moisture or foreign materials penetrate in the manufactured battery cell, and thus the electrode assembly is short-circuited.

Further, in recent years, a shape of the battery cell has been diversified in order to cope with a device having a thin structure or a geometrical structure. In addition, a volume of the electrode assembly has been designed to be relatively large so as to have a high capacity and an output characteristic, whereas an area of the sealing-planned part for sealing has been designed to be gradually reduced so as to have a small size of the battery case.

In the situation, the above-described problem, that is, the matter in which the sealing-planned part of a portion adjacent to the electrode lead is not tightly sealed is becoming more serious.

Therefore, there is a high need for a technique capable of fundamentally solving these problems.

Technical Problem

The present invention has been made in an effort to solve the above-described problems of the conventional art and technical problems required from the past.

Specifically, the present invention has been made in an effort to provide a sealing apparatus having advantages of firmly bonding an electrode lead and a sealing-planned part adjacent to the electrode lead by applying heat and pressure even to the sealing-planned part or an insulating film to be extended when pressurizing the sealing-planned part based on a structure in which an application area of pressure and heat is increased.

Technical Solution

An exemplary embodiment of the present invention provides a sealing apparatus for sealing a sealing-planned part of a battery case in which an electrode lead protrudes, by applying heat and pressure in a battery cell having a structure in which an electrode assembly and an electrolyte solution are embedded in a battery case of a laminate sheet, wherein the sealing apparatus includes a pair of sealing blocks for bonding the sealing-planned part by applying pressure and heat to the sealing-planned part at an upper portion and a lower portion with the sealing-planned part and the electrode lead protruding from the sealing-planned part interposed therebetween;

the sealing blocks are formed with two or more protrusion parts each extending in a direction of the electrode assembly and/or in a direction opposite to the electrode assembly; and the protrusion part further applies heat and pressure to a corresponding portion of the sealing-planned part extending along an end portion of the electrode lead by heat and pressure of the sealing blocks, thereby sealing the extended sealing-planned part. As described above, the sealing-planned part in a sheet form is inevitably extended by pressurization. In the conventional sealing apparatus 20 shown in FIG. 2, members pressurizing the sealing-planned part 21 at an upper portion and a lower portion have a shape corresponding to the sealing-planned part 21 in a plane, thereby protruding to an outer side of the sealing apparatus 20 when the sealing-planned part 21 is extended.

Therefore, in the conventional sealing apparatus, since it is impossible to apply heat and pressure to the extended sealing-planned part, the sealing-planned part may not be sealed, and consequently, sealing force of a battery case may be low, and thus when the battery cell is used for a long time, leakage of electrolyte solution and penetration of water and foreign matters may occur by separation of sealing of the battery cell.

In particular, in a boundary surface between the electrode lead 22 and the sealing-planned part 21, an area to which heat is applicable is excessively narrow, and thus sealing property is very low even though the sealing is possible. For this reason, as described above, it is even more fatal if the sealing-planned part, which is extended at the above-described portion, is not sealed.

In consideration of this, the present invention provides a sealing apparatus having a novel structure in which not only the sealing-planned part but also the inevitably extended sealing-planned part in a sealing process are further able to be sealed.

In detail, the sealing apparatus according to the present invention may have a protrusion part, which extends from the sealing block toward a direction of an electrode assembly and in a direction opposite to the electrode assembly, and thus the sealing-planned part may be sealed by additionally applying heat and pressure to the sealing-planned part extending in the above-described directions.

That is, the sealing apparatus has a structure in which the application area of pressure and heat of the sealing blocks with respect to the sealing-planned part is substantially increased by the protrusion part, which is more effective at a portion of the electrode lead where an area to which heat is applicable is considerably narrow.

A shape of the protrusion part may be a round structure including a polygon or a curve on a vertical cross section, and the shape may be selected in consideration of a thickness of the sealing-planned portion to be extended, an extended form of the sealing-planned part, etc.

For example, when the thickness of the sealing-planned part is thin, the sealing-planned part to be extended has a small area, but is extended in a relatively sharp shape at the time of pressurization. In this case, when the protrusion part pressurizes the extended sealing-planned part, the sealing-planned part is extended in a form in which an angled edge portion is curve, and thus a rounded structure including curves may be more suitable for extensive pressurization.

On the other hand, when the thickness of the sealing-planned part is very thick, the sealing-planned part to be extended has a large area and is extended in a relatively round shape at the time of pressurization. In this case, when the protrusion part pressurizes the extended sealing-planned part, the sealing-planned part is extended in an angled edge form in the round structure, and thus the protrusion part having a polygonal structure may be more effective for extensive pressurization.

The protrusion part may also have a wedge-shaped structure in a plane. The protrusion part has a very sharply protruding shape in a 'V' shape, and has an advantage in that a sharpened edge of the protrusion part is able to more precisely pressurize the sealing-planned part to be extended in the 'V' shape along the electrode lead.

An extension length of the protrusion part may be 5% to 30% relative to a width of the sealing-planned part. Here, the extension length of the protrusion part means the maximum length of the protrusion part from an end portion of the sealing block.

When the extension length of the protrusion part is less than the above-described range, it is difficult to effectively pressurize the sealing-planned part to be extended, and a heat application range is also very limited, and thus it is not possible to achieve an intended effect of the present invention. Conversely, when the extension length of the protrusion part is more than the above-described range, it is not preferable since the extended sealing-planned part is further extended or is completely melted by heat and pressure, and thus bonding is not able to be performed. In consideration of the above description, the extension length of the protrusion part may be more preferably 15% to 20% relative to the width of the sealing-planned part.

As described above, the sealing apparatus according to the present invention has a special structure capable of more tightly sealing the sealing-planned part adjacent to the electrode lead. Hereinafter, a shape of the electrode lead and a detailed structure of the sealing blocks and the protrusion part for effectively sealing the sealing-planned part in consideration of the shape of the electrode lead will be described in detail through non-limiting examples described below.

In one specific example, the electrode lead may include an electrically conductive lead member and a pair of insulating films attached in a form of locally surrounding the lead member; and the insulating films may include a surplus bonding part bonded to each other at both side end portions of the lead member.

In the electrode lead, in a state in which a portion of the insulating films is in close contact with an inner surface of the sealing-planned part, a remaining portion of the insulating film may protrude outwardly; the sealing blocks may further bond the sealing-planned part and the insulating films that are in close contact with each other, and the protrusion parts may further bond the sealing-planned part extending along the end portion of the lead member and the insulating film exposed to the outside.

Generally, the insulating film may be in close contact with the inner surface of the sealing-planned part in a state in which a portion of the insulating film is interposed between the sealing-planned parts. In this state, the sealing block may apply heat and pressure to the sealing-planned part to bond a portion of the sealing-planned part and the insulating film.

However, as described above, the insulating film may be pushed in a protrusion direction of the lead member by pressure. In the sealing apparatus according to the present invention, the insulating film on which the protrusion part is exposed to the outside may be pressurized and fixed when the sealing block pressurizes the sealing-planned part, and thus it is possible not only to suppress a pushing phenomenon of the insulating film but also to bond the extended sealing-planned part to the insulating film exposed to the outside. Even if the insulating film is partially pushed, the insulating film may be immediately sealed with the sealing-planned part to be extended, by the protrusion part, and thus a phenomenon that the insulating film is completely deviated to the outer side of the sealing-planned part may be prevented.

In one specific example, the sealing blocks may include a first block that pressurizes the sealing-planned part at an upper portion; and a second block that pressurizes the sealing-planned part at a lower portion, and the protrusion parts may be formed in the first block and the second block, respectively.

That is, in the sealing apparatus, the protrusion parts formed on the first block and the protrusion parts formed on the second block face each other in a state in which the first block and the second block face each other, and when the first block and the second block come in close contact with each other, the protrusion parts formed respectively on the blocks are also in close contact with each other.

Here, each of the first block and the second block may include a pair of first steps formed at positions corresponding to both side end portions of the electrode lead on a vertical cross section; and second steps extending from the first steps, respectively, and formed at positions corresponding to both side end portions of the surplus bonding part in the insulating film.

Specifically, the first steps may have a depth that approximately corresponds to or is smaller than a thickness of the lead member and the insulating film that is locally added to the lead member, and a width therebetween may approximately correspond to the width of the lead member.

Accordingly, the first steps may have a shape of a recessed groove having the depth and the width, and the lead member and the insulating film may be inserted into the recessed groove formed by the first steps.

Specifically, the second steps may have a depth that approximately corresponds to or is smaller than a thickness of the surplus bonding part, and a width therebetween may be a length corresponding approximately to a length from an end portion of the surplus bonding part that is bonded at an end portion of one side of the lead member to an end portion of the surplus bonding part that is bonded at an end portion of the other side thereof.

Accordingly, the second steps may have a shape of another recessed groove having the depth and width, and the surplus bonding parts may be inserted into the recessed groove.

A material for forming the first block, the second block, and each of the protrusion parts is not particularly limited as long as it is a material capable of conducting heat, but more specifically, the material may be one or more selected from metals capable of having both strength and heat conduction such as stainless steel, steel, titanium, etc., and heat conductive metals such as aluminum, copper, lead, tin, etc.

Inner portions of the first block, the second block, and the respective protrusion parts may have a heating means such as a heater, a heating wire, or the like, for applying heat. The first block, the second block, and the respective protrusion parts may be heated by the heating means, and thus heat may be applied to the sealing-planned part and the insulating film that are in contact with the first block, the second block, and the protrusion parts. Here, a plurality of heating means may be embedded inside the first and second steps, and thus the electrode lead and the sealing-planned part to be inserted into the recessed grooves formed by these steps may be quickly bonded by heating in a short time. Here, since the lead member is also heated, the sealing-planned part may be more effectively bonded to the insulating film attached on the lead member.

Hereinafter, a structure in which the first block and the second block bond the electrode lead and the adjacent sealing-planned part is described in detail.

First, when the first block and the second block pressurize the sealing-planned part, a portion of the sealing-planned part may be bent by the first step while the electrode lead is inserted between the first steps to thereby be in close contact with the insulating films that are attached to both side surfaces of the lead member, and then may be bonded thereto.

Here, a remaining portion of the sealing-planned part may be in close contact with the insulating films that are attached to an upper surface and a lower surface of the lead member in the electrode lead inserted between the first steps, and then may be bonded thereto.

That is, in the present invention, the sealing-planned part may be bonded to the insulating film at a side surface of the lead member in state in which the sealing-planned part is bent corresponding to the first steps formed on the first block and the second block. Due to this point, it should be noted that the sealing-planned part may enlarge a close contact area in a side surface direction of the lead member as well as an upper surface of the electrode lead to secure a wide heat application area for each block.

Accordingly, the above-described sealing apparatus structure may utilize a very limited heat application area to be capable of firmly bonding the sealing-planned part with respect to the lead member and the insulating film, and preventing an undesired gap between the sealing-planned part and the lead member from occurring.

At the same time, when the first block and the second block pressurize the sealing-planned part, a portion of the sealing-planned part may be bent by the second step while the insulating film is inserted between the second steps to thereby be in close contact with the both side end portions of the surplus bonding part, and then may be bonded thereto.

In addition, a remaining portion of the sealing-planned part may be in close contact with an upper surface and a lower surface of the surplus bonding parts that are inserted between the second steps, and then may be bonded thereto.

Similar to the sealing structure in the first steps described above, in this structure, the sealing-planned part may be bonded to a side surface of the surplus bonding parts in a state in which the sealing-planned part is bent corresponding to the second steps formed on the first block and the second block. Due to this point, the sealing-planned part may enlarge a close contact area in a side surface direction of the surplus bonding parts as well as an upper surface of the surplus bonding parts to secure a wide heat application area for each block.

Accordingly, the above-described sealing apparatus structure may utilize a very limited heat application area to be capable of firmly bonding the sealing-planned part with respect to the surplus bonding parts, and preventing an undesired gap between the sealing-planned part and the surplus bonding part from occurring.

Meanwhile, the protrusion parts of the first block and the second block may include, in each of the first steps, a pair of first protrusion parts protruding toward the electrode assembly; and a pair of second protrusion parts protruding in opposition to the first protrusion parts, and the protrusion parts of the first block and the second block may also further include, in each of the second steps, a pair of third protrusion parts protruding toward the electrode assembly; and a pair of fourth protrusion parts protruding in opposition to the third protrusion parts.

Hereinafter, a structure in which the protrusion parts bond the electrode lead and the adjacent sealing-planned part is described in detail.

First, when the first block and the second block pressurize the sealing-planned part, the sealing-planned part extending in a direction of the electrode lead may be bent by the first steps while the electrode lead is inserted between the second protrusion parts to thereby be in close contact with the insulating films that are attached to the electrode lead, and then may be bonded thereto.

At the same time, when the first block and the second block pressurize the sealing-planned part, the first protrusion parts may be formed so that the sealing-planned part extending in a direction of the electrode assembly is in close contact with the insulating films that are attached to the electrode lead, and then is bonded thereto.

That is, in the sealing apparatus of the present invention, the sealing-planned part extended by the first block and the second block may be further bonded in a direction of the electrode lead and a direction of the electrode assembly by the first protrusion parts and the second protrusion parts, thereby more firmly bonding the electrode lead and the sealing-planned part adjacent thereto.

Similar to this, when the first block and the second block pressurize the sealing-planned part, the surplus bonding part of the insulating film may be inserted between the fourth protrusion parts, and the sealing-planned part extending in a direction of the electrode lead may be in close contact with the surplus bonding part while being bent so as to surround the surplus bonding part by the second steps, and then may be bonded thereto.

In addition, when the first block and the second block pressurize the sealing-planned part, the third protrusion parts may be formed so that the sealing-planned part extending in a direction of the electrode assembly is in close contact with the insulating films that are attached to the electrode lead, and then is bonded thereto.

In the above structures, the extended sealing-planned part may be further bonded in the first protrusion parts to the fourth protrusion parts extending from the second steps, and due to this point, the sealing apparatus according to the present invention may more firmly bond the sealing-planned part.

Another embodiment of the present invention provides a battery cell manufactured by the sealing apparatus as described above.

Specifically, the battery cell may include a pouch type battery case of a laminate sheet;

a non-aqueous electrolyte solution; and an electrode assembly including a cathode, an anode, and a separator, wherein the sealing-planned part of the battery case is thermally fused in a state in which the electrode assembly and the non-aqueous electrolyte solution are embedded in the battery case.

The battery cell is not particularly limited in its kind, but specific examples thereof may include a lithium secondary battery having advantages such as high energy density, discharge voltage, and output stability, etc., such as a lithium ion (Li-ion) secondary battery, a lithium polymer (Li-polymer) secondary battery, a lithium ion polymer (Li-ion polymer) secondary battery, or the like.

Generally, the lithium secondary battery may be composed of a cathode, an anode, a separator, and a lithium salt-containing non-aqueous electrolyte solution.

The cathode may be manufactured, for example, by applying a mixture of a cathode active material, a conductive material, and a binder on a cathode current collector and/or an extended current collecting part, followed by drying. Optionally, a filler may be further added to the mixture.

The cathode current collector and/or the extended current collecting part is generally formed to have a thickness of 3 to 500 µm. The cathode current collector and the extended current collecting part are not particularly limited as long as they have electrical conductivity without causing a chemical change in the battery. For example, stainless steel, aluminum, nickel, titanium, sintered carbon, or a surface-modified material with carbon, nickel, titanium, silver, or the like, on an aluminum surface or a stainless steel surface may be used.

The cathode current collector and the extended current collecting part may have fine protrusions and depressions formed on a surface thereof to enhance bonding force of the cathode active material, and may be used in various forms such as films, sheets, foils, nets, porous bodies, foams, non-woven fabrics, etc.

Examples of the cathode active material may include layered compounds including lithium cobalt oxide (LiCoO$_2$), lithium nickel oxide (LiNiO$_2$), and the like, or compounds substituted with one or more transition metals; lithium manganese oxides represented by Chemical Formula Li$_{1+x}$Mn$_{2-x}$O$_4$ wherein x is 0 to 0.33, LiMnO$_3$, LiMn$_2$O$_3$, LiMnO$_2$, etc.; lithium copper oxides (Li$_2$CuO$_2$); vanadium oxides such as LiV$_3$O$_8$, LiFe$_3$O$_4$, V$_2$O$_5$, Cu$_2$V$_2$O$_7$, etc.; Ni-site type lithium nickel oxides represented by Chemical Formula LiNi$_{1-x}$M$_x$O$_2$ wherein M is Co, Mn, Al, Cu, Fe, Mg, B or Ga, and x is 0.01 to 0.3; lithium manganese complex oxides represented by LiMn$_{2-x}$M$_x$O$_2$ wherein M is Co, Ni, Fe, Cr, Zn or Ta, and x is 0.01 to 0.1 or Li$_2$Mn$_3$MO$_8$ wherein M is Fe, Co, Ni, Cu or Zn; LiMn$_2$O$_4$ in which a part of Li in the Chemical Formula is substituted with an alkaline earth metal ion; disulfide compounds; Fe$_2$(MoO$_4$)$_3$, etc., but the cathode active material is not limited thereto.

The conductive material is generally added in an amount of 1 to 30 wt % based on the total weight of the mixture including the cathode active material. The conductive material is not particularly limited as long as it has electrical conductivity without causing a chemical change in the battery. Examples of the conductive material may include graphite such as natural graphite, and artificial graphite, or the like; carbon black such as carbon black, acetylene black, Ketjen black, channel black, furnace black, lamp black, and summer black, or the like; conductive fiber such as carbon fiber, metal fiber, or the like; metal powder such as carbon fluoride, aluminum, nickel powder, or the like; conductive whisker such as zinc oxide, potassium titanate, or the like; conductive metal oxide such as titanium oxide, or the like; conductive material such as polyphenylene derivative, or the like, may be used.

The binder is a component which assists in bonding of the active material and the conductive material, etc., and bonding to the current collector, and is generally added in an amount of 1 to 30 wt % based on the total weight of the mixture containing the cathode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, etc.

The filler is optionally used as a component for suppressing expansion of the cathode, and is not particularly limited as long as it is a fibrous material without causing a chemical change in the battery. Examples of the filler may include olefin-based polymers such as polyethylene, polypropylene, etc.; fibrous materials such as glass fibers and carbon fibers, etc.

The anode may be manufactured by applying an anode active material on an anode current collector and/or an extended current collecting part, followed by drying. If required, the above-described components may be optionally included in the anode.

The anode current collector and/or the extended current collecting part is generally formed to have a thickness of 3 to 500 μm. The anode current collector and/or the extended current collecting part are not particularly limited as long as they have electrical conductivity without causing a chemical change in the battery. For example, copper, stainless steel, aluminum, nickel, titanium, sintered carbon, a surface-modified material with carbon, nickel, titanium, silver, or the like, on a copper surface or a stainless steel surface, or an aluminum-cadmium alloy may be used. In addition, similar to the cathode current collector, the anode current collector and/or the extended current collecting part may have fine protrusions and depressions formed on a surface thereof to enhance bonding force of the anode active material, and may be used in various forms such as films, sheets, foils, nets, porous bodies, foams, non-woven fabrics, etc.

Examples of the anode active material may include carbons such as non-graphitized carbon, graphite-based carbon, etc.; metal complex oxides such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, Group 1, Group 2 and Group 3 elements in the Periodic Table, halogen; 0<x≤1; 1≤y≤3; 1≤z≤8), etc.; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; conductive polymers such as polyacetylene, etc.; Li—Co—Ni-based materials, etc.

The separator is interposed between the cathode and the anode, and as the separator, an insulating thin film having high ion permeability and mechanical strength is used. The separator generally has a pore diameter of 0.01 to 10 μm and generally has a thickness of 5 to 300 μm. As the separator, for example, olefin-based polymers such as polypropylene having chemical resistance and hydrophobicity; a sheet or a non-woven fabric made of glass fiber, polyethylene, or the like, is used. When a solid electrolyte such as a polymer is used as the electrolyte, the solid electrolyte may also serve as the separator.

The electrolyte solution may be a lithium salt-containing non-aqueous electrolyte solution, and may be formed of a non-aqueous electrolyte solution and a lithium salt.

Examples of the non-aqueous electrolyte solution may include non-aqueous organic solvents, organic solid electrolytes, inorganic solid electrolytes, etc., but the non-aqueous electrolyte solution is not limited thereto. Examples of the non-aqueous organic solvent may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, propylene carbonate derivatives, tetrahydrofuran derivatives, ether, methyl propionate, ethyl propionate, etc.

Examples of the organic solid electrolyte may include a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer including an ionic dissociation group, etc.

Examples of the inorganic solid electrolyte may include Li nitrides, Li halides, Li sulfates such as $Li_3N$, LiI, $Li_5Ni_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

The lithium salt is a material that is favorable to be dissolved in the non-aqueous electrolyte. For example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonic acid lithium, 4 phenyl boric acid lithium, imide, etc., may be used.

Further, for the purpose of improving charge/discharge characteristics, flame retardancy, etc., for example, pyridine, triethylphosphite, triethanolamine, cyclic ether, ethylene diamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol, aluminum trichloride, etc., may be added to the non-aqueous electrolyte solution. In some cases, in order to impart nonflammability, a halogen-containing solvent such as carbon tetrachloride, ethylene trifluoride, or the like, may be further added. In order to improve high temperature storage characteristic, carbon dioxide gas may be further added or fluoro-ethylene carbonate (FEC), propene sultone (PRS), or the like, may be further added.

In one specific example, the lithium salt-containing non-aqueous electrolyte solution may be prepared by adding a lithium salt such as $LiPF_6$, $LiClO_4$, $LiBF_4$, $LiN(SO_2CF_3)_2$, or the like, to a mixed solvent including a cyclic carbonate of EC or PC which is a high-dielectric solvent and a linear carbonate of DEC, DMC or EMC which is a low viscosity solvent.

Yet another embodiment of the present invention provides a battery pack including at least one battery cell, or a battery module including at least two battery packs, or a device including at least one battery cell.

The device may be, but is not limited to, a mobile device such as, for example, a notebook computer, a netbook, a tablet PC or a smart pad, or a large device such as an electric vehicle, a hybrid electric vehicle, a plug-in hybrid electric vehicle, or the like.

DESCRIPTION OF THE DRAWINGS

Referring to FIG. 10, the protrusion parts may have a wedge shape, a polygonal shape, or a round shape on a vertical cross section.

First, the protrusion part 300a having a wedge shape has a very sharply protruding shape in a 'V' shape, and has an advantage in that a sharpened edge of the protrusion part is able to more precisely pressurize the sealing-planned part 150a to be extended in the 'V' shape along the electrode lead.

DETAILED DESCRIPTION OF THE EMBODIMENTS

Hereinafter, the present invention will be described with reference to the drawings according to Examples of the present invention, which is provided for a better understanding of the present invention, and thus, the scope of the present invention is not limited thereto.

Figure 1:
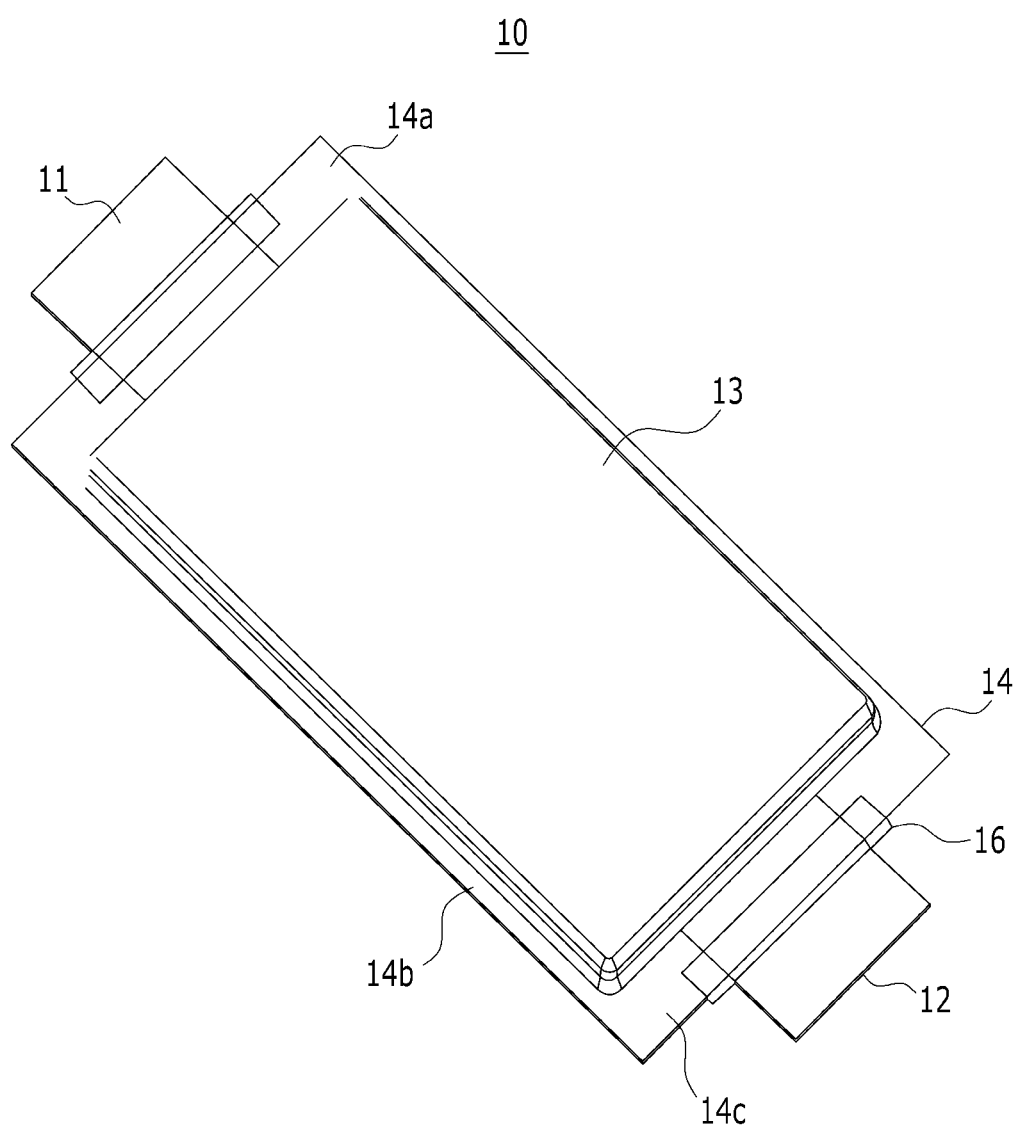
FIG. 1 is a schematic view of a pouch type battery cell.
Figure 2:
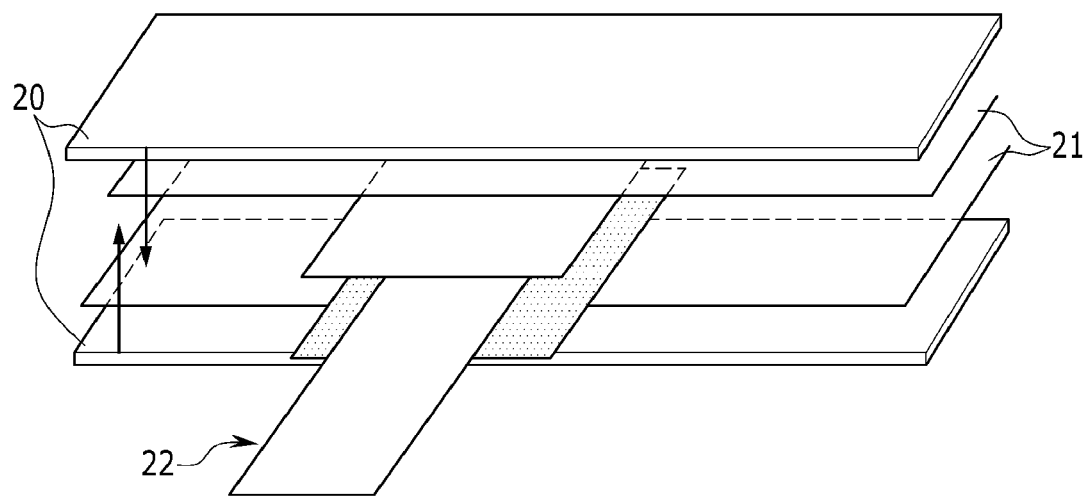
FIG. 2 is a schematic view of a sealing apparatus according to the conventional art.
Figure 3:
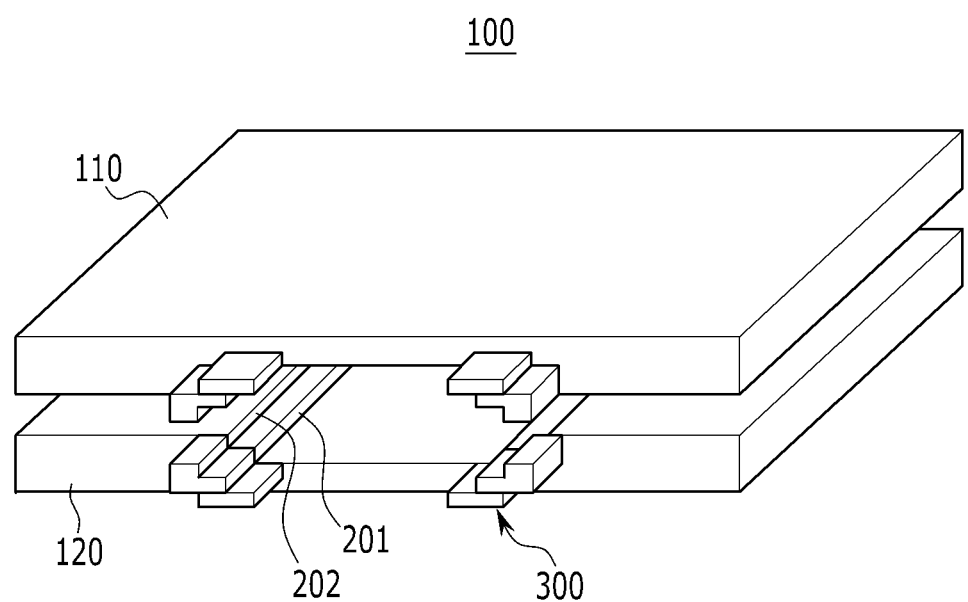
FIG. 3 is a schematic view of a sealing apparatus according to an exemplary embodiment of the present invention.
Figure 4:
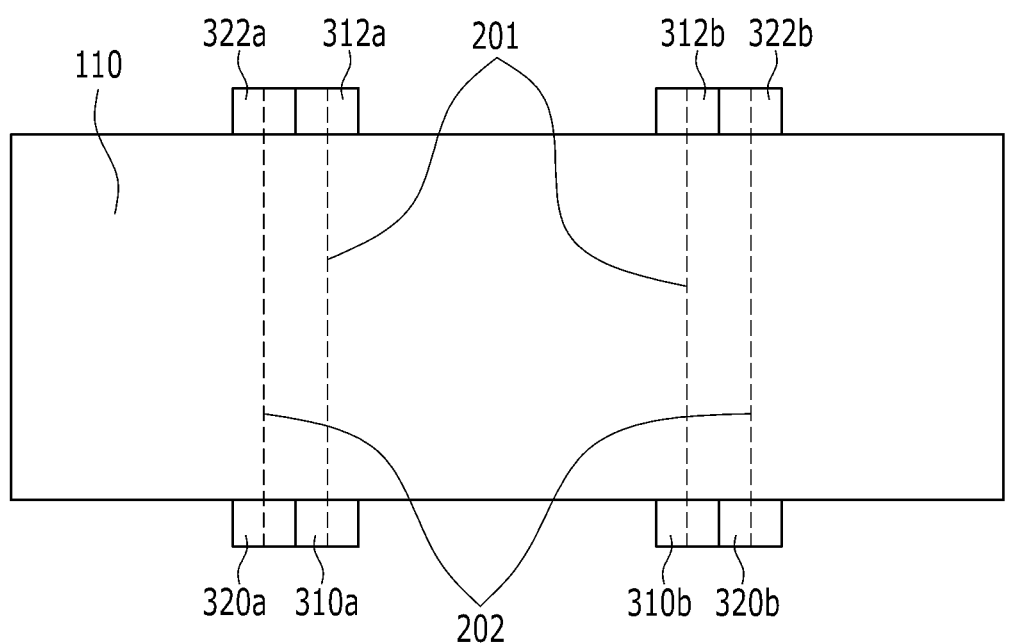
FIG. 4 is a schematic plan view of the sealing apparatus.
Figure 5:
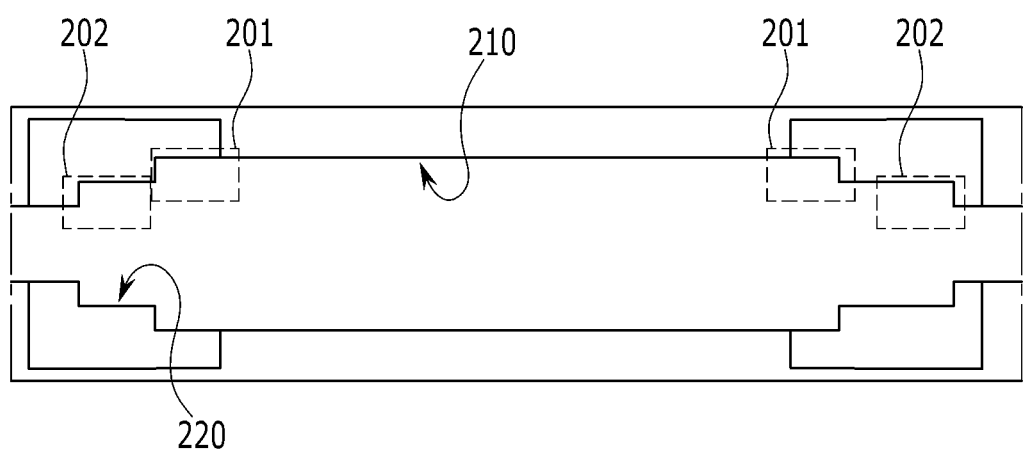
FIG. 5 is a vertical cross-sectional view of the sealing apparatus.

FIG. 3 shows a schematic view of a sealing apparatus according to one example of the present invention, FIG. 4 shows a plan view of the sealing apparatus, and FIG. 5 shows a vertical cross-sectional view of the sealing apparatus.

Referring to these drawings, the sealing apparatus 100 is a sealing block for applying heat and pressure to the sealing-planned part 150 of the battery cell, and includes a first block 110 and a second block 120 opposing each other at an upper part and a lower part.

Each of the first block 110 and the second block 120 includes a pair of protrusion parts 300 extending outwardly from one side end portion and a pair of protrusion parts (not shown) extending outwardly from the other side end portion. The protrusion parts 300 extend from steps 201 and 202 formed on the first block 110 and the second block 120.

Figure 6:
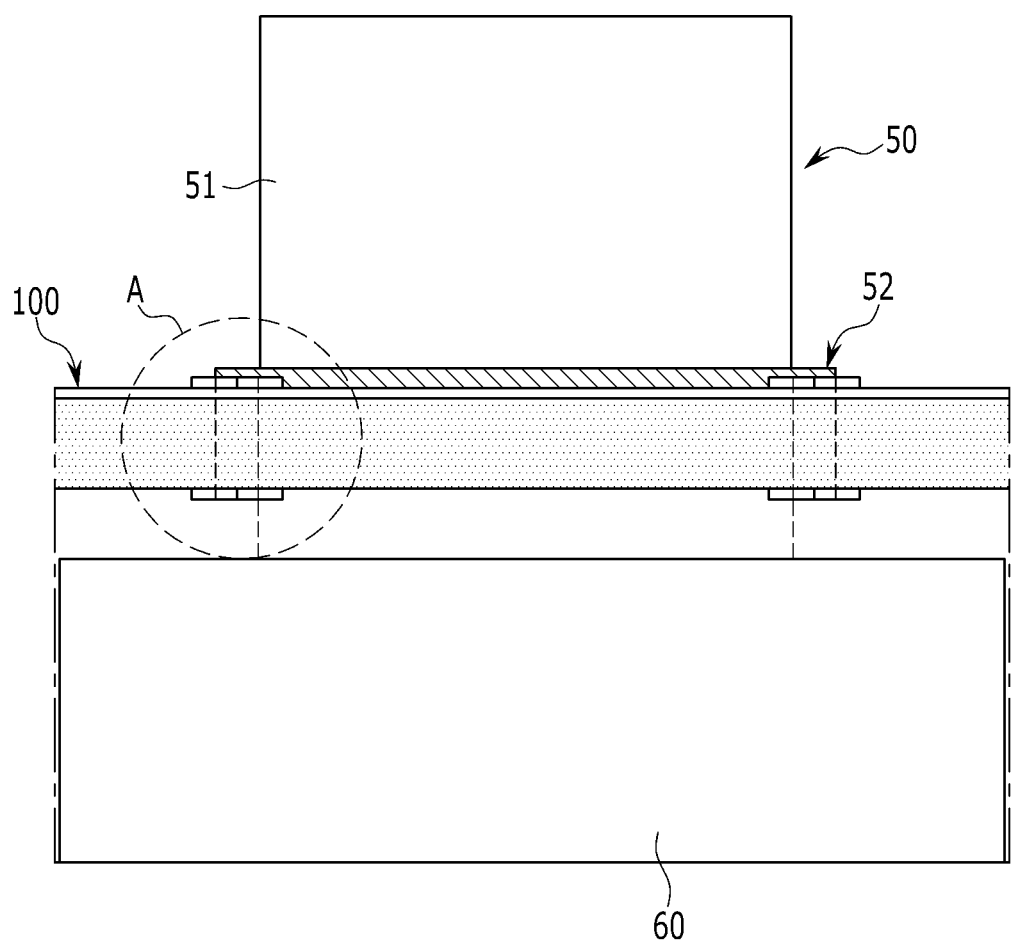
FIG. 6 is a schematic view showing a structure in which a sealing apparatus is mounted to an electrode lead and a sealing-planned part of a battery cell.
Figure 7:
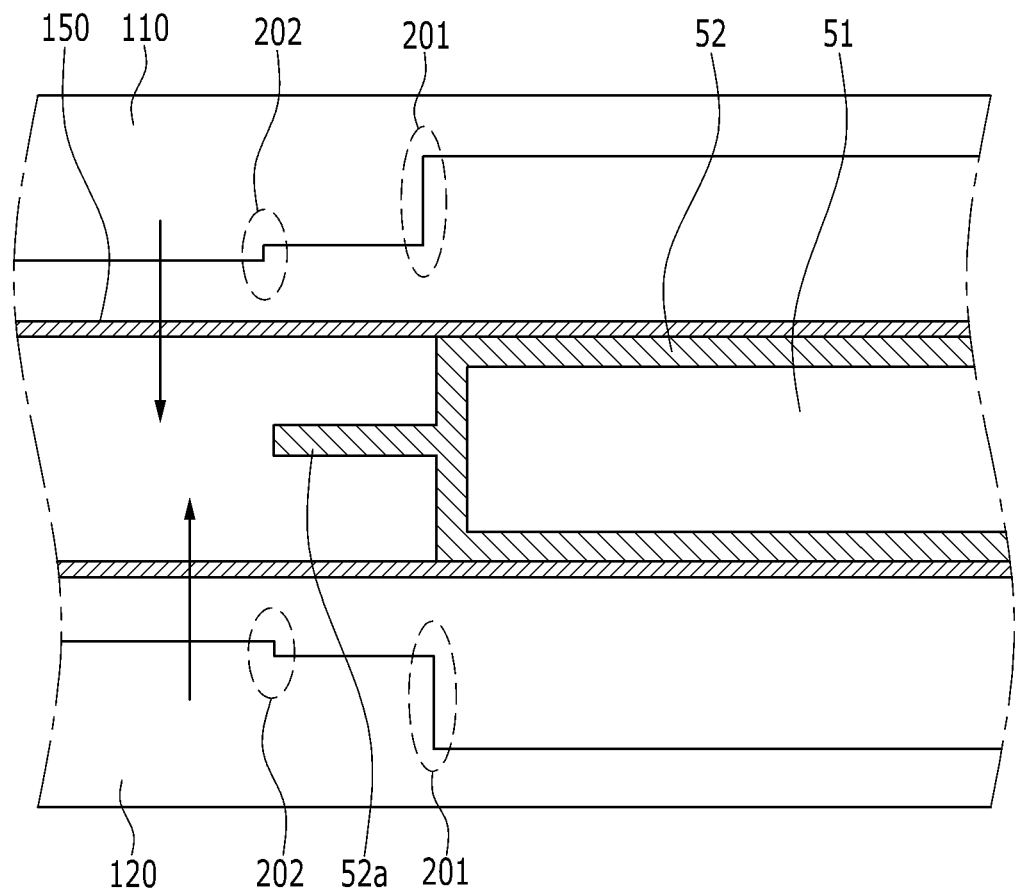
FIGS. 7 to 8 are schematic views showing a series of processes in which the sealing-planned part is bonded in the sealing apparatus.
Figure 8:
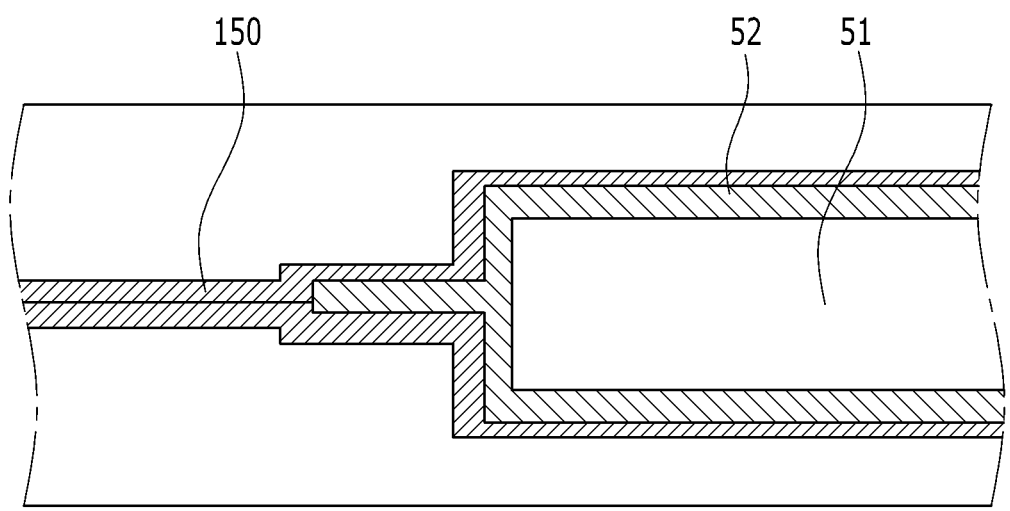

Specifically, the steps 201 and 202 into which protruding portions of the electrode leads 50 are inserted may be formed in the battery cell having surfaces on which the first block 110 and the second block 120 face each other. In order to more easily explain the structure of the steps 201 and 202, structures of the electrode lead 50 shown in FIGS. 5 and 6 will be described.

Referring to FIGS. 3 to 6, the electrode lead 50 includes an electrically conductive lead member 51 and a pair of insulating films 52 attached in a form of locally surrounding the lead member 51.

Further, the insulating film 52 may include a surplus bonding part 52a bonded to each other at both side end portions of the lead member 51.

Therefore, in the present invention, the electrode lead 50 means the lead member 51 in a state in which the insulating film 52 is added, but this concept may include or may not include the surplus bonding part 52a of the insulating film 52.

Accordingly, the first block 110 and the second block 120 may have an inner surface shape corresponding so that the electrode lead 50, that is, the lead member 51 in a state in which the insulating film 52 is added is able to be inserted.

In the present invention, this is explained by the concept of the step. These steps may include a pair of first steps 201 formed at positions corresponding to both side end portions of the electrode lead 50, on the vertical cross section. The lead member 51 in a state in which the insulating film 52 is added may be inserted between the first steps 201 together with the sealing-planned part 150 and a portion between the first steps 201 may be referred to as a first recessed groove 210.

Further, the first block and the second block 120 may further include second steps 202 formed at positions corresponding to both side end portions of the surplus bonding part 52a in the insulating film 52, on the vertical cross section, respectively, and the second steps 202 may extend from the first steps 201, respectively.

The surplus bonding part 52a may be inserted between the second steps 202 together with the sealing-planned part 150, and a portion between the second steps 202 may be referred to as a second recessed groove 220.

Here, the protrusion parts may protrude from the first steps 201 and the second steps 202, respectively.

Specifically, the protrusion parts may include, in each of the first steps 201, a pair of first protrusion parts 310a and 310b protruding toward the electrode assembly 60; and a pair of second protrusion parts 312a and 312b protruding in opposition to the first protrusion parts 310a and 310b.

The protrusion parts may also include, in each of the second steps 202, a pair of third protrusion parts 320a and 320b protruding toward the electrode assembly 60; and a pair of fourth protrusion parts 322a and 322b protruding in opposition to the third protrusion parts 320a and 320b.

Accordingly, each of the first protrusion parts 310a and 310b and the second protrusion parts 312a and 312b may include a step extending from the first steps 201, and each of the third protrusion parts 320a and 320b and the fourth protrusion parts 322a and 322b may include a step extending from the second steps 202.

Heating means (not shown) may be provided in an inner part of each of the protrusion parts 310a, 310b, 312a, 312b, 320a, 320b, 322a, and 322b so that heat is applicable to the sealing-planned part 150, and the heating means may be the same as or different from the heating means provided in the first block 110 and the second block 120.

Hereinafter, referring to FIGS. 6 to 9, a structure in which the electrode lead 50 and the adjacent sealing-planned part 150 are bonded by the first block 110 and the second block 120 will be described in detail.

First, when the first block 110 and the second block 120 pressurize the sealing-planned part 150, the electrode lead 50 together with the sealing-planned part 150 may be inserted between the first steps 201.

Here, a portion of the sealing-planned part 150 may be bent by the first step to be pressurized and to be in close contact with the insulating film 52 that is attached to both side surfaces of the lead member 51. In this state, the insulating film 52 and the sealing-planned part 150 may be bonded in a side surface direction of the electrode lead 50 by heat applied to inner surfaces of the first block 110 and the second block 120. In addition, the sealing-planned) part 150 inserted into and in close contact with the first recessed groove 210 may be in close contact with the insulating film 52 attached to the upper and lower surfaces of the lead member 51 in the electrode lead 50, and then may be bonded thereto.

That is, in the present invention, the sealing-planned part 150 may be bonded to the insulating film 52 at a side surface of the lead member 51 in state in which the sealing-planned part 150 is bent corresponding to the first steps 201 formed on the first block 110 and the second block 120. Due to this point, it should be noted that the sealing-planned part 150 may enlarge a close contact area in a side surface direction of the lead member 51 as well as an upper surface of the electrode lead 50 to secure a wide heat application area for each block.

At the same time, when the first block 110 and the second block 120 pressurize the sealing-planned part 150, the insulating film 52 may be inserted between the second steps 202.

Here, a portion of the sealing-planned part 150 may be bent by the second step, pressurized and in close contact with both side end portions of the surplus bonding portions 52a, and then may be bonded by heat. Further, the sealing-planned part 150 inserted into and in close contact with the second recessed groove 220 may be in close contact with the upper and lower surfaces of the surplus bonding parts 52a, and then may be bonded thereto.

Similar to the sealing structure in the first steps 201 described above, in this structure, the sealing-planned part 150 may be bonded to a side surface of the surplus bonding parts 52a in a state in which the sealing-planned part 150 is bent corresponding to the second steps 202 formed on the first block 110 and the second block 120. Due to this point, the sealing-planned part 150 may enlarge a close contact area in a side surface direction of the surplus bonding parts 52a as well as an upper surface of the surplus bonding parts 52a to secure a wide heat application area for each block.

Meanwhile, in the sealing apparatus 100 of the present invention, the electrode lead 50 and the adjacent sealing-planned part 150 may be further bonded at the protrusion part at the same time as the above-described process.

Specifically, when the first block 110 and the second block 120 pressurize the sealing-planned part 150, the electrode lead 50 together with the sealing-planned part 150 may be inserted between the first steps of 201, and portions 152, 154, 156, and 158 of the sealing-planned part 150 may be extended in a direction of the electrode lead 50 by a pressurization force between the first recessed groove 210 and the electrode lead 50. The extension is actually caused very locally. In particular, the sealing-planned part 150 tends to be extended at a portion where the sealing-planned part 150 is bent by the step.

However, in the sealing apparatus 100 of the present invention, even if the first block 110 and the second block 120 pressurize the sealing-planned part 150, since the sealing-planned parts 152, 154, 156, and 158 that are extended in the inside of the protrusion part extended from the step are positioned, the sealing-planned part 150 extended by the heat from the protrusion part 300 may be bonded. In particular, the sealing-planned parts 152 and 156 extending in the direction of the electrode lead 50 may be bent by the first steps 201 on the second protrusion parts 312a and 312b while the electrode lead 50 is inserted between the second protrusion parts 312a and 312b to thereby be in close contact with the insulating film 52 attached to the electrode lead 50, and then may be further bonded thereto.

Likewise, when the first block 110 and the second block 120 pressurize the sealing-planned part 150, the portion 154 and 158 of the sealing-planned part 150 may be extended in a direction of the electrode assembly 60 by the pressurization force between the first recessed groove 210 and the electrode lead 50, wherein the first protrusion parts 310a and 310b may be formed so that the sealing-planned part 150 extending in a direction of the electrode assembly 60 is in close contact with the insulating film 52 that is attached to the electrode lead 50, and then is bonded thereto.

That is, in the sealing apparatus 100 of the present invention, the sealing-planned part 150 extended by the first block 110 and the second block 120 may be further bonded in the direction of the electrode lead 50 and the direction of the electrode assembly 60 by the first protrusion parts 310a and 310b and the second protrusion parts 312a and 312b, thereby more firmly bonding the electrode lead 50 and the sealing-planned part 150 adjacent thereto.

Further, when the first block 110 and the second block 120 pressurize the sealing-planned part 150, the surplus bonding part 52a of the insulating film 52 may be inserted between the fourth protrusion parts 322a and 322b, and the sealing-planned part 150 extending in a direction of the electrode lead 50 may be in contact with the surplus bonding part 52a while being bent so as to surround the surplus bonding part 52a by the second steps 202, and then may be bonded thereto. At the same time, the third protrusion parts 320a and 320b may be formed so that the sealing-planned part 150 extending in a direction of the electrode assembly 60 is in close contact with the insulating films 52 that are attached to the electrode lead 50, and then is bonded thereto.

As described above, the sealing apparatus 100 according to the present invention may have a structure in which an application area of pressure and heat is substantially increased by sealing blocks with respect to the sealing-planned part 150 by the protrusion part, and may have a structural advantage in that these protrusion parts may further apply heat and pressure to the sealing-planned part 150 extending in the direction of the electrode assembly 60 and the direction opposite thereto, thereby sealing the sealing-planned part 150, and thus the sealing-planned part 150 may be more firmly bonded. Meanwhile, FIG. 9 is a schematic view showing various shapes of protrusion parts according to another exemplary embodiment of the present invention.

Figure 9:
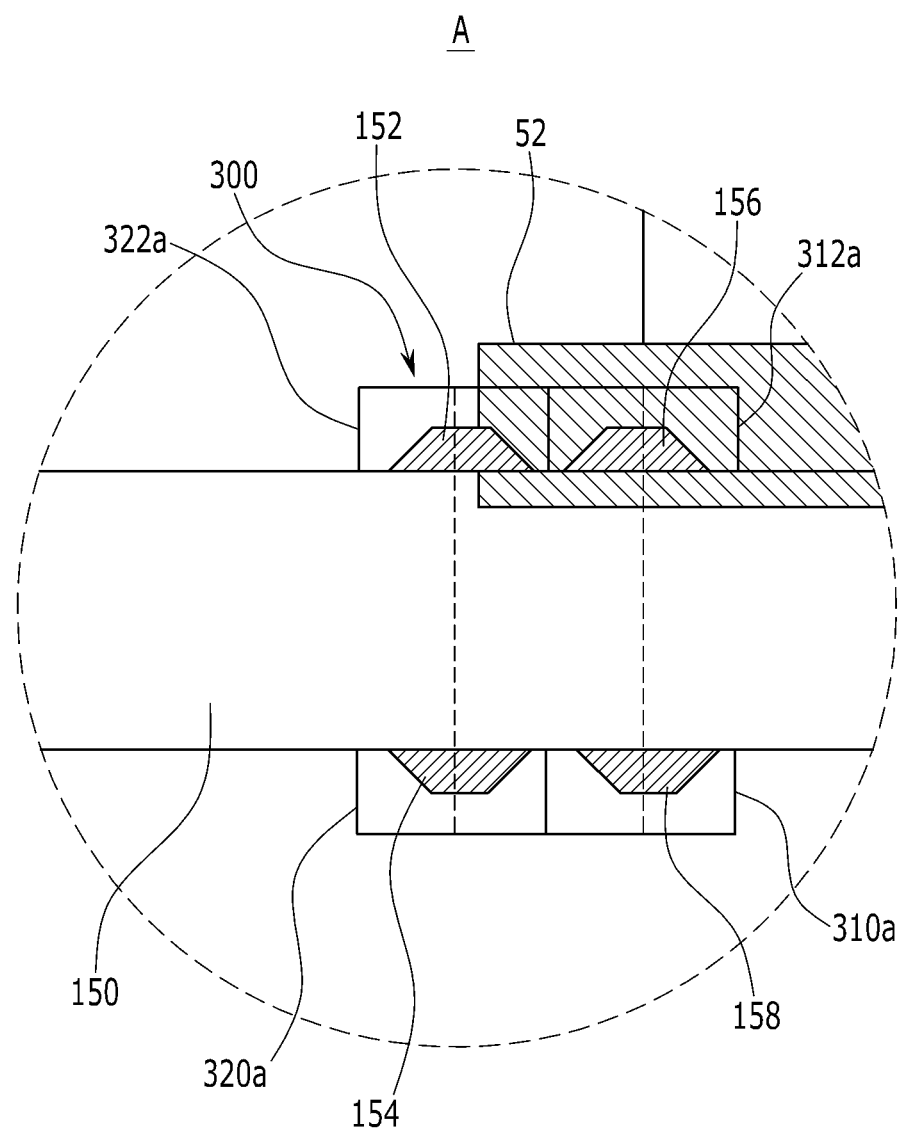
Figure 10:
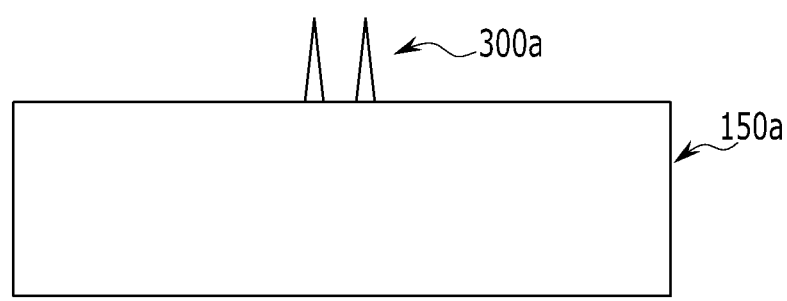
FIG. 10 is a schematic view showing various shapes of protrusion parts according to another exemplary embodiment of the present invention.
Figure 10:
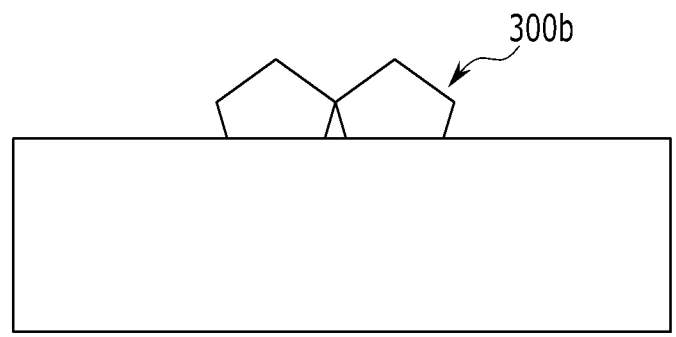
Figure 10:
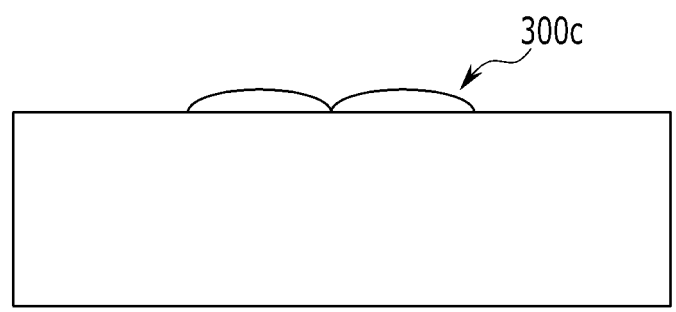

Referring to FIG. 9, the protrusion parts may have a wedge shape, a polygonal shape, or a round shape on a vertical cross section.

First, the protrusion part 300a having a wedge shape has a very sharply protruding shape in a 'V' shape, and has an advantage in that a sharpened edge of the protrusion part is able to more precisely pressurize the sealing-planned part to be extended in the 'V' shape along the electrode lead.

The protrusion part 300b having a polygonal shape is preferable when a thickness of the sealing-planned part is very thick. Generally, the thick sealing-planned part has a large area and is extended in a round structure. In this case, when the protrusion part 300b pressurizes the extended sealing-planned part, the sealing-planned part is extended in an angled edge form in the round structure, and thus the protrusion part 300b having a polygonal shape may more extensively pressurize the sealing-planned part.

On the other hand, when the thickness of the sealing-planned part is thin, the sealing-planned part to be extended has a small area, but is extended in a relatively sharp shape at the time of pressurization. In this case, when the protrusion part 300c having a round structure pressurizes the angled edge portion of the extended sealing-planned part by the round structure, thereby preventing the sealing-planned part from being extended beyond the protrusion part.

It will be understood by those skilled in the art that various modifications and change can be made in the scope of the present invention based on the above description.

INDUSTRIAL APPLICABILITY

As described above, the sealing apparatus according to the present invention may have a structure in which an application area of pressure and heat is substantially increased by sealing blocks with respect to the sealing-planned part by the protrusion part, and may have a structural advantage in that these protrusion parts may further apply heat and pressure to the sealing-planned part extending in the direction of the electrode assembly and the direction opposite thereto, thereby sealing the sealing-planned part, and thus the sealing-planned part may be more firmly bonded.

The invention claimed is:

1. A sealing apparatus for sealing a sealing-planned part of a battery case from which an electrode lead protrudes, the sealing apparatus comprising:
a pair of sealing blocks configured to bond the sealing-planned part by applying pressure and heat to the sealing-planned part at an upper portion and a lower portion of the sealing-planned part, with the electrode lead protruding from the sealing-planned part, the electrode lead being interposed between the upper portion and the lower portion,
wherein the sealing blocks each have a heating surface and front and rear peripheral surfaces extending from opposite ends of the heating surface, the sealing blocks each having two or more protrusion parts each extending away from the front peripheral surface of the respective sealing block in a first direction parallel to the heating surface or extending away from the rear peripheral surface of the respective sealing block in a second direction opposite to the first direction, the protrusion parts each being disposed around a respective portion of an opening defined in at least one of the front peripheral surface or the rear peripheral surface, the opening being configured to receive the electrode lead therein, and
wherein each protrusion part is configured to apply heat and pressure to a corresponding portion of the sealing-planned part extending along an end portion of the electrode lead thereby sealing the sealing-planned part.

2. The sealing apparatus of claim 1, wherein:
the sealing apparatus has a structure in which an application area of pressure and heat of the sealing blocks with respect to the sealing-planned part is increased by the protrusion part.

3. The sealing apparatus of claim 1, wherein:
the electrode lead includes an electrically conductive lead member and a pair of insulating films attached in a form of locally surrounding the lead member;
the insulating films include a surplus bonding part bonded to each other at both side end portions of the lead member;
in the electrode lead, in a state in which a portion of the insulating films is in close contact with an inner surface of the sealing-planned part, a remaining portion of the insulating film protrudes outwardly; and
the sealing blocks further bond the sealing-planned part and the insulating films that are in close contact with each other, and the protrusion parts further bond the sealing-planned part extending along the end portion of the lead member and the insulating film exposed to the outside.

4. The sealing apparatus of claim 3, wherein: the sealing blocks include a first block that pressurizes the sealing-planned part at an upper portion; and
a second block that pressurizes the sealing-planned part at a lower portion,
the protrusion parts are formed in the first block and the second block, respectively.

5. The sealing apparatus of claim 4, wherein: each of the first block and the second block includes a pair of first steps formed at positions corresponding to both side end portions of the electrode lead on a vertical cross section; and
second steps extending from the first steps, respectively, and formed at positions corresponding to both side end portions of the surplus bonding part in the insulating film.

6. The sealing apparatus of claim 5, wherein: the protrusion parts of the first block and the second block include, in each of the first steps,
a pair of first protrusion parts protruding toward the electrode assembly; and
a pair of second protrusion parts protruding in opposition to the first protrusion parts, and
the protrusion parts of the first block and the second block also further include, in each of the second steps,
a pair of third protrusion parts protruding toward the electrode assembly; and
a pair of fourth protrusion parts protruding in opposition to the third protrusion parts.

7. The sealing apparatus of claim 5, wherein:
when the first block and the second block pressurize the sealing-planned part, a portion of the sealing-planned part is bent by the first step while the electrode lead is inserted between the first steps to thereby be in close contact with the insulating films that are attached to both side surfaces of the lead member, and then is bonded thereto.

8. The sealing apparatus of claim 7, wherein: a remaining portion of the sealing-planned part is in close contact with the insulating films that are attached to an upper surface and a lower surface of the lead member in the electrode lead inserted between the first steps, and then is bonded thereto.

9. The sealing apparatus of claim 5, wherein: when the first block and the second block pressurize the sealing-planned part, a portion of the sealing-planned part is bent by the second step while the insulating film is inserted between the second steps to thereby be in close contact with the both side end portions of the surplus bonding part, and then is bonded thereto.

10. The sealing apparatus of claim 9, wherein: a remaining portion of the sealing-planned part is in close contact with an upper surface and a lower surface of the surplus bonding parts that are inserted between the first steps, and then is bonded thereto.

11. The sealing apparatus of claim 6, wherein: when the first block and the second block pressurize the sealing-planned part, the sealing-planned part extending in a direction of the electrode lead is bent by the first steps while the electrode lead is inserted between the second protrusion parts to thereby be in close contact with the insulating films that are attached to the electrode lead, and then is bonded thereto.

12. The sealing apparatus of claim 6, wherein: when the first block and the second block pressurize the sealing-planned part, the first protrusion parts are formed so that the sealing-planned part extending in a direction of the electrode assembly is in close contact with the insulating films that are attached to the electrode lead, and then is bonded thereto.

13. The sealing apparatus of claim 6, wherein: when the first block and the second block pressurize the sealing-planned part, the surplus bonding part of the insulating film is inserted between the fourth protrusion parts, and the sealing-planned part extending in a direction of the electrode lead is in close contact with the surplus bonding part while being bent so as to surround the surplus bonding part by the second steps, and then is bonded thereto.

14. The sealing apparatus of claim 6, wherein: when the first block and the second block pressurize the sealing-planned part, the third protrusion parts are formed so that the sealing-planned part extending in a direction of the electrode assembly is in close contact with the insulating films that are attached to the electrode lead, and then is bonded thereto.

15. The sealing apparatus of claim 1, wherein: the protrusion part has a round structure including a polygon or a curved line on a vertical cross section.

16. The sealing apparatus of claim 1, wherein: the protrusion part has a wedge-shaped structure in a plane.

17. The sealing apparatus of claim 1, wherein: an extension length of the protrusion part is 5% to 30% relative to a width of the sealing-planned part.

\* \* \* \* \*